(12) United States Patent
Aumueller

(10) Patent No.: US 8,906,146 B2
(45) Date of Patent: Dec. 9, 2014

(54) AIR DRYER CARTRIDGE

(71) Applicant: Haldex Brake Products GmbH, Heidelberg (DE)

(72) Inventor: Ralf Aumueller, Frankfurt (DE)

(73) Assignee: Haldex Brake Products GmbH, Heidelberg (DE)

( * ) Notice: Subject to any disclaimer, the term of this patent is extended or adjusted under 35 U.S.C. 154(b) by 150 days.

(21) Appl. No.: 13/647,836

(22) Filed: Oct. 9, 2012

(65) Prior Publication Data

US 2013/0087046 A1 Apr. 11, 2013

(30) Foreign Application Priority Data

Oct. 10, 2011 (DE) .......................... 10 2011 054 329

(51) Int. Cl.
*B01D 53/26* (2006.01)
*B60T 17/00* (2006.01)
*B01D 53/04* (2006.01)

(52) U.S. Cl.
CPC ........... *B60T 17/004* (2013.01); *B01D 53/0415* (2013.01); *B01D 53/261* (2013.01)
USPC ............................................. 96/149; 96/151

(58) Field of Classification Search
USPC .............. 96/137, 147, 149, 151; 55/490, 513, 55/518, 475, DIG. 17
See application file for complete search history.

(56) References Cited

U.S. PATENT DOCUMENTS

| | | | |
|---|---|---|---|
| 3,407,936 A * | 10/1968 | Balogh .......................... | 210/282 |
| 3,507,097 A | 4/1970 | Crowley et al. | |
| 3,572,008 A * | 3/1971 | Hankison et al. ............... | 95/105 |
| 4,026,685 A * | 5/1977 | Grix ................................ | 96/113 |
| 4,029,486 A | 6/1977 | Frantz | |
| 4,572,725 A * | 2/1986 | Kojima .......................... | 96/137 |
| 4,673,419 A | 6/1987 | Kojima | |
| 4,816,047 A * | 3/1989 | Neal ................................ | 96/137 |
| 4,957,516 A | 9/1990 | Daniels | |
| 5,002,593 A | 3/1991 | Ichishita | |
| 5,190,569 A | 3/1993 | McGrath | |
| 5,269,837 A | 12/1993 | Ohashi | |

(Continued)

FOREIGN PATENT DOCUMENTS

| | | |
|---|---|---|
| DE | 26 42 435 A1 | 4/1977 |
| DE | 699 08 918 T2 | 5/2004 |

(Continued)

OTHER PUBLICATIONS

European Search Report in co-pending, related EP Application No. 12187624.7, mailed Dec. 21, 2012.

(Continued)

*Primary Examiner* — Frank Lawrence
(74) *Attorney, Agent, or Firm* — Thomas | Horstemeyer, LLP

(57) ABSTRACT

The present invention relates to an air dryer cartridge designated for an air dryer of a utility vehicle. The air dryer cartridge comprises a supporting element. At least one spring is interposed between a supporting element and a pressing element for a desiccant. The supporting element is movable with respect to a housing of the air dryer cartridge. The supporting element is freely accessible from the outside of said air dryer cartridge. The present invention in particular provides the option to use the at least one spring both for pressing the desiccant as well as for clamping the air dryer cartridge in an air dryer.

16 Claims, 5 Drawing Sheets

(56) References Cited

U.S. PATENT DOCUMENTS

| | | | | |
|---|---|---|---|---|
| 5,286,282 | A | * | 2/1994 | Goodell et al. ............... 96/113 |
| 5,286,283 | A | * | 2/1994 | Goodell ........................ 96/113 |
| 5,580,451 | A | * | 12/1996 | Tack ............................. 210/266 |
| 5,620,507 | A | * | 4/1997 | Oborne et al. ................ 96/149 |
| 5,622,544 | A | | 4/1997 | Shamine et al. |
| 5,779,772 | A | * | 7/1998 | Unger et al. .................. 96/137 |
| 5,792,245 | A | * | 8/1998 | Unger et al. .................. 96/137 |
| 6,484,413 | B1 | * | 11/2002 | Larsson ......................... 34/80 |
| 7,416,586 | B1 | | 8/2008 | Below et al. |
| 2005/0274259 | A1 | | 12/2005 | Young et al. |
| 2012/0312171 | A1 | * | 12/2012 | Schaebel ...................... 96/118 |

FOREIGN PATENT DOCUMENTS

| | | |
|---|---|---|
| DE | 198 27 566 B4 | 7/2007 |
| EP | 0 275 201 A1 | 7/1988 |
| EP | 0 137 909 B1 | 1/1991 |
| EP | 0 875 432 A2 | 11/1998 |
| EP | 1 064 077 B1 | 6/2003 |
| GB | 1 505 479 | 3/1978 |

OTHER PUBLICATIONS

European Search Report in co-pending, related EP Application No. 14158904.4, mailed Apr. 4, 2014.

German Office Action in related, co-pending German Application No. 10 2011 054 329.5, mailed Jun. 17, 2014.

* cited by examiner

AIR DRYER CARTRIDGE

CROSS REFERENCE TO RELATED APPLICATIONS

This application claims priority to co-pending German Patent Application No. DE 10 2011 054 329.5 entitled "Lufttrocknungskartusche", filed Oct. 10, 2011.

FIELD OF THE INVENTION

The present invention generally relates to an air dryer cartridge designated for an air dryer of a utility vehicle. Furthermore, the invention relates to an air dryer for a compressed air system of a utility vehicle, wherein the air dryer is equipped with an air dryer cartridge.

In pressurized air systems of utility vehicles, air dryer cartridges are used for processing the pressurized air. Usually, the air dryer cartridge is located between a pressurized air source (in particular a compressor and/or a reservoir) and at least one consumer circuit of the utility vehicle. The air dryer cartridge is used for cleaning and drying the pressurized air. This is done by use of at least one filter and/or at least one desiccant wherein the pressurized air is cleaned and dried by streaming through the filter and/or the desiccant.

BACKGROUND OF THE INVENTION

DE 699 08 918 T2 discloses an air dryer wherein the air dryer cartridge is housed in a housing of the air dryer. The housing of the air dryer is built with two housing parts, namely a base element and a top cover element. The top cover element is in a first approximation bell-shaped comprising a side wall in the shape of a hollow cylinder and a dome-shaped top cover wall. The base element is assembled with the top cover element. In the assembled state the base element and the top cover element define a housing with a closed inner chamber being cylindrical with a dome-shaped arching at the top. The air dryer cartridge is located in the inner chamber. The air dryer cartridge comprises a housing which is generally closed but comprises passages, openings or ports for building inlets and outlets for the stream of pressurized air. The air dryer cartridge is housed with a minimal resulting radial gap with respect to the hollow cylindrical side wall of the top cover element. In a radial outer edge region a ring-shaped sealing element is interposed between the top wall of the top cover element of the air dryer and the air dryer cartridge. The sealing element comprises an oversize such that the cartridge and the sealing element are clamped between the base element and the top cover element for fixing the air dryer cartridge.

An air dryer cartridge according to DE 699 08 918 T2 builds two chambers, wherein one chamber is located radially inside from the other chamber. In the radial outer hollow cylindrical ring chamber, a desiccant and/or a filter is/are located. The outer chamber is separated by a hollow cylindrical intermediate wall from a radial inner cylindrical chamber wherein (another) desiccant is housed. During a load phase of the air dryer, pressurized air streams from an inlet chamber of the base element through passages of a base wall of the air dryer cartridge into the ring chamber. Within the ring chamber, the pressurized air streams parallel to a longitudinal axis of the air dryer cartridge to the top cover region of the air dryer cartridge. In the top cover region of the air dryer cartridge the pressurized air is transferred via an air-permeable textile material and an air-permeable top wall of the air dryer cartridge into an intermediate chamber. The intermediate chamber is build between the top wall of the air dryer cartridge and the top wall of the top cover element of the air dryer. The pressurized air streams from the intermediate chamber through the air-permeable top wall of the air dryer cartridge and through the air-permeable textile material into the radial inner cylindrical chamber. In this chamber the air streams with an orientation parallel to the longitudinal axis towards the base element. The pressurized air is then fed by air passages in the base region of the air dryer cartridge and an outlet chamber of the base element to the pressurized air system, in particular to the consumer circuits. Collected humidity and/or impurities are removed from the desiccant, the filters and the collecting chambers by use of reversed cleaned pressurized air in a regeneration phase of the air dryer cartridge.

In order to fix the particles of the desiccant in the chambers, in order to compact the desiccant and/or in order to apply a pressing force to the desiccant, the air dryer cartridge of DE 699 08 918 T2 comprises separate pressing elements for each chambers. The pressing elements are (similar to pistons) axially displaceable in the chamber. On the side opposite to the desiccant the pressing elements are supported by springs. These springs bias the pressing element and the desiccant with a predefined pressing force. One base of the springs is supported at the pressing element, whereas the other base of the springs is supported by a supporting element. According to DE 699 08 918 T2, this supporting element is built by a fixed base wall of the air dryer cartridge.

Air dryer cartridges with a supporting element for supporting a spring biasing the desiccant are also known from U.S. Pat. No. 4,673,419 A, U.S. Pat. No. 5,002,593 A and EP 0 137 909 B1. For these embodiments the supporting element is built by a top cover element building a fixed part of the housing.

Furthermore, so-called spin-on-cartridges are known. These types of cartridges are not clamped by a spring element between a base element and a top cover element of the air dryer. Instead, for these embodiments the air dryer cartridges comprise a solid and massy base wall with a central bore having an inner thread. The base wall is with its inner thread screwed on a connecting socket of the base element of the air dryer. The connecting socket at the same time serves as an inlet and/or outlet port for pressurized air to and/or from the air dryer cartridge.

SUMMARY OF THE INVENTION

The present invention relates to an air dryer cartridge and an air dryer with a modified design. It is in particular an object of the present invention to improve
- the design of an air dryer cartridge with respect to the manufacturing costs,
- the options for and the procedure of an exchange of the desiccant,
- the conditions of the desiccant during the storage of the air dryer cartridge,
- the consumption of material an/or energy and/or
- the way of fixing the air dryer cartridge in an air dryer.

One embodiment of the invention relates to an improved fixing of the air dryer cartridge in the air dryer. Furthermore, the invention relates to the force transfer of the pressing forces of the desiccant in the air dryer cartridge (on the one hand side during stock holding of the air dryer cartridge and on the other hand side during the operation of the air dryer cartridge in the air dryer).

One inventive embodiment provides an air dryer cartridge wherein the supporting element is (freely) accessible from the outside of the air dryer cartridge. Accordingly, the supporting element is at least partially not covered by a fixed wall of the housing of the air dryer cartridge. Due to the fact that the supporting element is accessible from outside, it is possible to apply outer forces and/or to change a position of the supporting element from the outside of the air dryer cartridge. These measures can be taken manually by the user and/or might be taken automatically during the assembly of the air dryer cartridge with the air dryer. This embodiment of the invention covers a one-piece supporting element (e.g. a supporting plate) or a supporting element built with a plurality of linked parts. To name only some non-limiting examples, the supporting element might be built with a type of supporting plate with a protrusion, a pin, plug, collar and/or connecting element or drive element which is freely accessible from the outside. Another option is that a protrusion, pin, bold, collar, connecting element or drive element and the like extends through an opening of the housing of the air dryer cartridge to the outside of the housing for providing the free accessibility (here the other part of the supporting element is not necessarily freely accessible).

The free access to the supporting element might lead to the following advantages which are only mentioned by way of examples:

It is possible that before, during or after the use of the air dryer cartridge in an air dryer the supporting element is manipulated from the outside, in particular for temporarily or permanently influencing the pressing of the desiccant.

Furthermore, it is possible that an opening which is used for the accessibility to the supporting element is used for disassembling the supporting element. In subsequent steps of dissembling, also a pressing element and/or a spring might be removed. In this state it is possible to exchange an exhausted desiccant with a fresh desiccant with the subsequent re-assembly of the pressing element, the spring and the supporting element. Accordingly, an exchange of the desiccant is possible, wherein a lot of components of the air dryer cartridge (e.g. the housing) might be used also for the reconditioned air dryer cartridge.

By providing the housing of the air dryer cartridge with an opening for providing the accessibility of the supporting element, it is possible to build the housing with a decreased overall surface, decreased weight and/or decreased material volume.

For another (alternative or cumulative) embodiment of the invention, the supporting element does not (exclusively) support at the housing of the air dryer cartridge (in particular at the hollow cylindrical side wall). Instead, for this embodiment the pressing element and the supporting element are located in the top region of the air dryer cartridge. The supporting element is held at a base wall of the air dryer cartridge which is accomplished by an anchor element extending through the air dryer cartridge. By use of the anchor element, it is possible to keep the side walls of the housing of the air dryer cartridge free from holding forces for the supporting element. This leads to an increased resistance and/or decreased required wall thicknesses of the side walls. Within the frame of the present invention it might also be possible to use a plastic material for the side wall and/or for the housing of the air dryer cartridge. On the other hand, the anchor element extending through the air dryer cartridge might reduce the lever arm and the resulting bending moment caused by the pressing force which is transferred to the base region. For one embodiment of the invention, the anchor element is located centrally and has an orientation coaxial to the longitudinal axis of the air dryer cartridge. This embodiment leads to a minimized bias with a bending moment. By means of the above measures, the massive design of the base element of the housing of the air dryer cartridge might be reduced and/or the use of a plastic material is possible for the base element. Embodiments using a type of anchor extending through the air dryer cartridge might generally also be used for a closed housing according to DE 699 08 918 T2. For this modification of DE 699 08 918 T2 the sealing element no longer needs to be used for fixing the air dryer cartridge in the air dryer. For another embodiment of the invention, it is possible to use the above described anchor element in connection with an air dryer cartridge wherein the supporting element is freely accessible from the outside of the air dryer cartridge.

Generally, any design of the housing of the air dryer cartridge might be used for providing the free accessibility of the supporting element and for the construction, design and configuration of the supporting element,
the at least one spring and
the pressing element.

For one embodiment of the invention, a housing of the air dryer cartridge is built with an opening to an inner chamber of the air dryer cartridge. In the inner chamber the desiccant is housed. The supporting element at least partially closes the opening of the housing. To mention one non-limiting example, the housing of the air dryer cartridge might be built with a hollow cylindrical side wall with a circular opening in the top end region. In a rough approximation a "piston-like" pressing element enters into the hollow cylindrical side wall for pressing the desiccant. In case of a plate-like pressing element, a plate-like supporting element might be positioned parallel to the pressing element, wherein the at least one spring is interposed between the pressing element and the supporting element.

The supporting element might be located within the hollow cylindrical side wall or above the same and might at least partially close the opening. In case that the supporting element is movable with respect to the housing of the air dryer cartridge, a displacement of the supporting element changes the bias of the at least one spring and changes the pressing force of the desiccant. The movement of the supporting element away from the desiccant is limited by a stop element. The stop element might be held at the housing, might be linked with the housing or might be built by the housing itself. A displacement along the degree of freedom of the supporting element (limited by the stop element) is used for changing the pressing force of the desiccant. On the other hand, the supporting element being movable under a change of the bias of the spring (in contrast to a supporting element being fixed at the housing) builds a spring element which according to the invention might be used for an additional function. The limit of the degree of freedom given by the stop element defines an end position of the supporting element correlating with a minimal pressing of the desiccant. Furthermore, it is possible that by use of the stop element the supporting element without additional measures does not remove from the unit built by the air dryer cartridge. Accordingly, for this embodiment the air dryer cartridge builds a transportable unit also when not assembled with the air dryer.

The moving degree of freedom of the supporting element and the use of the supporting element as a spring element for clamping the air dryer cartridge in the air dryer might also be used for a compensation of tolerances which in the end leads to a reduction of manufacturing requirements for the air dryer and the air dryer cartridge.

For one embodiment of the invention, the degree of freedom of the supporting element is used for reducing the pressing force of the desiccant during stocking and transportation whereas it is possible to increase the pressing with a displacement of the supporting element for the use of the air dryer cartridge in the air dryer. An increased pressing during the use of the air dryer cartridge might be of advantage in case of encountering oscillating inner pressures (e.g. up to 13 bar). These oscillating pressures and vibrations of the air dryer for too small pressing forces of the desiccant lead to relative displacements of the particles of the desiccant. These undesired relative displacements might result in increased wear.

For a preferred embodiment of the invention, the stop element is designed, configured and positioned such that a dimension of the air dryer cartridge limited by the supporting element and the stop element is larger than the corresponding dimension of a housing of an air dryer for which said air dryer cartridge is designated. This embodiment is now explained by way of a simple (non-limiting) example: In case that

- the above dimension is the longitudinal extension of the air dryer cartridge between the contact region of the supporting element in the position defined by the stop element and the base wall and this longitudinal extension is denoted with L,
- the distance between a counter contact region of the top wall of the housing of the air dryer (at which the contact region of the supporting element contacts in the assembled state) from the contact region of the base wall of the air dryer cartridge at a socket element of the air dryer is denoted with A, L>A or L−A=F holds. An assembly of the air dryer cartridge in the air dryer requires that the supporting element has to be moved away from the stop element along the degree of freedom with a displacement F. This displacement has the consequence that a tension of the spring and the pressing of the desiccant is increased. The increase of the tension of the spring and the pressing of the desiccant results from the product of F with the spring stiffness of the at least one spring. On the other hand, the displacement has the consequence that the tension of the spring is no longer supported by the stop element. Instead, the supporting element (after the displacement over the distance F) is supported with the tension of the spring at the top region of the housing of the air dryer. Accordingly, the air dryer cartridge is clamped in the housing of the air dryer for fixing the air dryer cartridge in the air dryer. An assembly of the air dryer requires that a top cover element is moved towards the socket element with a coinciding displacement F of the supporting element of the air dryer cartridge. With or after the displacement F of the supporting element the top cover element and the socket element of the air dryer are connected with each other and fixed relative to each other. It is also possible that the top cover element of the air dryer is screwed with the socket element of the air dryer, wherein with increasing screwing angle between top cover element and socket element the supporting element moves with an increase of the tension of the spring and of the pressing of the desiccant.

A lot of measures can be taken for building the stop element. To give only one non-limiting example, the stop element might be built by an upper edge or part of the side wall which might be angled in inner direction. For one embodiment of the inventive air dryer cartridge, the stop element is built with at least one anchor element extending through the air dryer cartridge. The anchor element or pulling element might also extend through the desiccant. It is also possible that the anchor element extends from an upper end region of the air dryer cartridge to the opposite end region of the air dryer cartridge, e.g. built by a base wall of the air dryer cartridge. Furthermore, it is possible that only one single anchor element is used. Besides other options, the invention suggests arranging the anchor element coaxial to the longitudinal axis of the air dryer cartridge. However, it is also possible to use a plurality of anchor elements that might be located centrally or offset from the center. For a non-limiting example two, three, four or more anchor elements are dispersed in circumferential direction with same distances from each other and from the longitudinal axis. For another embodiment of the invention, it is possible to use the anchor element not only for limiting the degree of freedom of the supporting element. Instead, it is also possible that the anchor element comprises an outer surface which is usable as a guiding surface for guiding the supporting element and/or the pressing element in lateral direction.

There are a lot of options for the design of the anchor element. For one embodiment the anchor element is built by a rod, a wire, a screw or a tube.

For another embodiment of the invention there is not only one spring interposed between the supporting plate and the pressing element. Instead, a plurality of springs is used. For one non-limiting example, the plurality of springs is uniformly dispersed in circumferential direction around the longitudinal axis.

Also for the design of the supporting element there are a lot of options covered by the invention. For one particular embodiment, the supporting element comprises an outer contact region which is freely accessible in case that the air dryer cartridge is not assembled with an air dryer. With the assembly of the air dryer cartridge with the housing of the air dryer, the contact region contacts a counter contact region of the housing of the air dryer. Contact forces between the contact region and the counter contact region cause the movement of the supporting element along the degree of freedom of the supporting element. It is possible that the contact region is built with a continuous contact surface (e.g. a ring surface) which might be arranged coaxial to the longitudinal axis of the air dryer cartridge. However, it is also possible that there is a plurality of contact surfaces dispersed uniformly in circumferential direction around the longitudinal axis. By means of the plurality of contact surfaces, a specific design and configuration of the contact region of the supporting element and the counter contact region of the air dryer is also suggested. this might be used for easing a sliding movement between the supporting element and the housing of the air dryer during the screwing process of screwing the top cover element of the housing of the air dryer with the socket element. To name only one non-limiting example, the contact region and/or the counter contact region might be equipped with a sliding layer or a lubricant for easing the screwing process. It is also possible that the contact region is built by a central contact surface which is located at the longitudinal axis of the air dryer cartridge in order to minimize the relative movement between the housing of the air dryer and the contact region of the supporting element during the screwing process of the housing of the air dryer.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 is a graphical representation of an example of an air dryer with an air dryer cartridge located therein according to various embodiments of the present invention.

FIG. 2 is a graphical representation of an example of an air dryer with an air dryer cartridge including a supporting element that comprises a pure plane circular disc according to various embodiments of the present invention.

FIG. 3 is a graphical representation of an example of an air dryer with an air cartridge having a narrowing side wall according to various embodiments of the present invention.

FIG. 4 is a graphical representation of an example of an air dryer with an air dryer cartridge having a rib extending spirally around the longitudinal axis of the air dryer cartridge according to various embodiments of the present invention.

FIG. 5 is a graphical representation of an example of an air dryer with an air dryer cartridge located therein according to various embodiments of the present invention.

DETAILED DESCRIPTION

Figure 1:
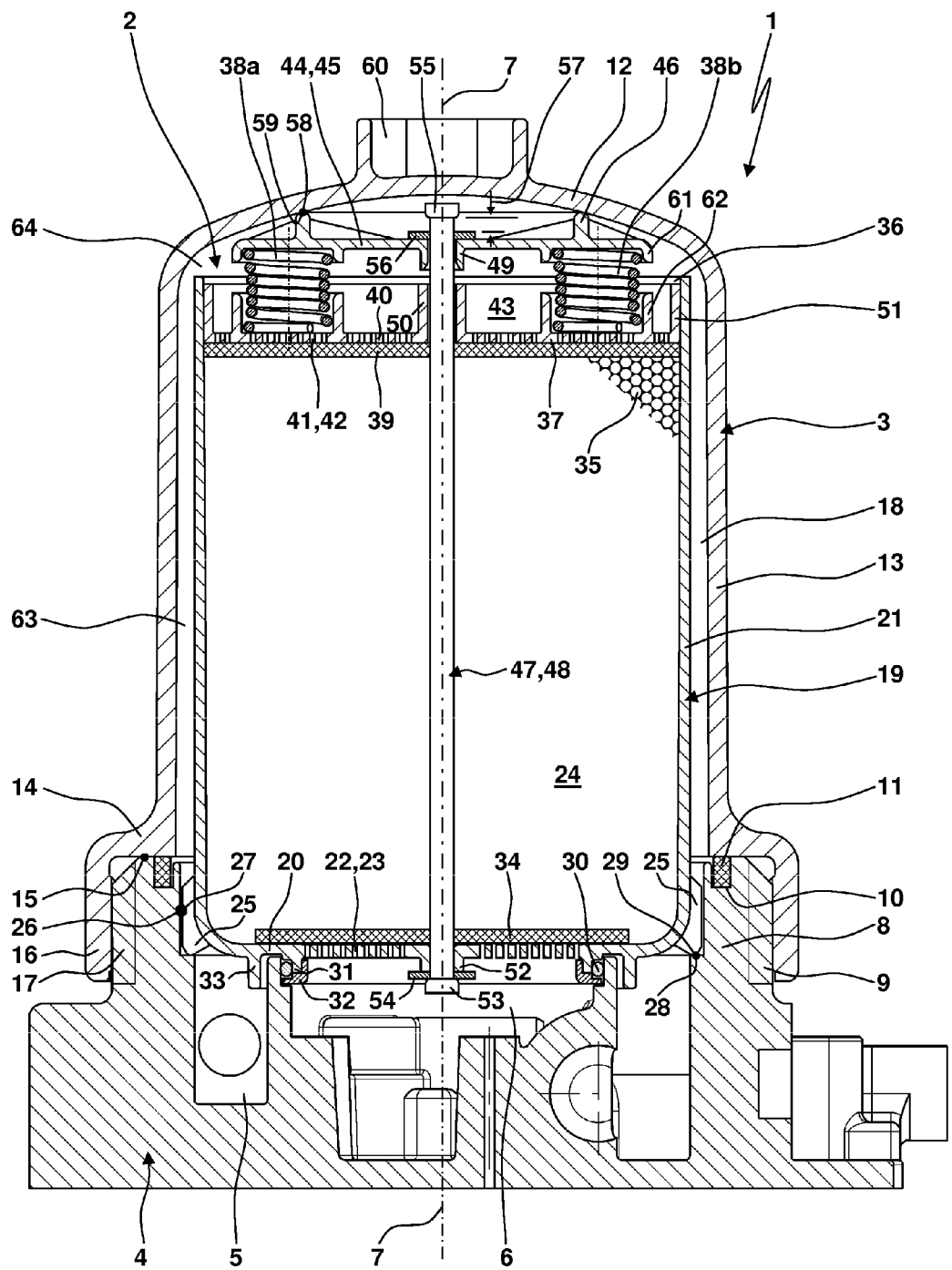
FIGS. 1 to 5 are longitudinal sections of different embodiments of an air dryer with an air cartridge according to the present invention.

Referring now in greater detail to the drawings, FIG. 1 illustrates an air dryer 1 with an air dryer cartridge 2 located therein. The air dryer 1 is built with a socket element 4 and a cover element 3 which is (in a first approximation) dome-shaped. The socket element 4 builds an inlet chamber 5 which (in the load phase) is connected with a pressurized air source (in particular a compressor). Furthermore, the socket element 4 comprises an outlet chamber 6 which is connected with the pressurized air system, in particular at least one consumer circuit. The socket element 4 comprises a ring-shaped collar 8 which has an orientation coaxial to a longitudinal axis 7-7. The collar 8 comprises an outer thread 9. At the front the collar 8 comprises a groove 10. A ring-shaped sealing element 11 is located in the groove 10. The socket element 4 has a massive design and has in particular 5 been produced by forming or molding. The socket element 4 is e.g. made of metal (in particular aluminium) or a plastic material.

The cover element 3 is dome-shaped with a domed or curved cover wall 12 and a side wall 13 in the shape of a hollow cylinder. For easing the removal of the cover element 3 from a mold, it is possible that the side wall 13 is slightly conical opening towards the bottom. In the end region facing away from the cover wall 13, the side wall 13 comprises a radial extension 14 for building a front surface 15 and a hollow cylindrical connecting region 16 equipped with an inner thread 17.

The cover element 3 and socket element 4 have a massive design and have in particular been produced by forming or molding. The cover element 3 and the socket element 4 are e.g. made of metal (in particular aluminium) or a plastic material.

In the assembled state the cover element 3 and the socket element 4 define an inner chamber 18. The inlet chamber 5 and the outlet chamber 6 are connected with the inner chamber 18. The air dryer cartridge 2 is located in the inner chamber 18.

The air dryer cartridge 2 is built with a housing 19 which (in the shown longitudinal section) is approximately U-shaped and symmetrically to its longitudinal axis. The transverse leg of the U builds a base wall 20, whereas the two parallel longitudinal legs of the U build the side wall 21. The base wall 20 comprises passages 22 (in particular bores 23) for a transfer of pressurized air between an inner chamber 24 of the housing 19 and the outlet chamber 6. In the transitional region between the base wall 20 and the side wall 21 the housing 19 comprises wing-like ribs 25 dispersed in circumferential direction. The ribs 25 build radial guiding surfaces 26 having an orientation parallel to the longitudinal axis 7-7. The guiding surfaces 26 interact with a cylindrically guiding surface 27 built by an inner surface of the collar 8 for providing a radial guidance, an exact positioning and orientation. Furthermore, with their front surfaces 28 facing towards the socket element 4 the ribs 25 contact a shoulder 29 of the socket element 4. By this contact, the position of the air dryer cartridge 2 relative to the socket element 4 in longitudinal direction is defined. A sealing element 30 for blocking a transfer of pressurized air between the inlet chamber 5 and the outlet chamber 6 is interposed between the socket element 4 and the base wall 20. For the embodiment shown in FIG. 1, the sealing element 30 is located in a groove having an orientation in radial inner direction. In the assembled state, a disc 32 is enclosed or trapped between the ring collar 31 and the socket element 4. With its radial outer surface the sealing element 30 contacts a hollow cylindrical sealing surface of the socket element 4. It is also possible that radially inside from the sealing element 30 the base wall builds another ring collar 33 for stiffening the base wall and/or for building a support or guidance for the assembly and the centering movement.

A non-woven fabric, a filter or a textile material 34 is positioned In the inner chamber 24 on the base wall 20 so that the passages 22 are covered. The desiccant 35 is located on this layer or material in the inner chamber 24 (only schematically shown in the figures). On the side opposite to the base wall 20 the end regions of the side wall 21 of housing 19 build an opening 36. The opening 36 is used for introducing the non-woven fabric 34 and the desiccant 35 into the inner chamber 24 of the housing 19. A pressing element 37 is inserted into the opening 36 (similar to a piston). The pressing element 37 is biased by at least one spring 38, here by two or more springs 38a, 38b, towards the base wall 20. Accordingly, the pressing element 37 is used for producing a pressing force of the desiccant 35 between the pressing element 37 and the base wall 20, For the embodiment shown in FIG. 1, another non-woven fabric, a textile material or a filter 39 is interposed between the desiccant 35 and the pressing element 37. The pressing element 37 is built by a pressing plate 40 having a hollow cylindrical guiding collar 51. The guiding collar 51 builds am small gap with the side wall 21 for providing a guidance and to some extent also a kind of sealing. The pressing plate 40 comprises passages 41, here bores 42. Pressurized air is transferred through the passages 41 from an outer region 43 of the air dryer cartridge 2 to the inner chamber 24 and the desiccant 35 (and vice versa). A base of the spring 38a, 38b is supported at the pressing element 37. The other base of the spring 38a, 38b is supported at the supporting element 44. For the shown embodiment the supporting element 44 is built by a supporting plate 45.

At the side facing away from the spring 38a, 38b the supporting element 44 comprises a supporting collar 46. In the assembled state of the air dryer 1 as shown in FIG. 1, a front surface of the supporting collar 46 is pressed with a contact region 58 at a counter contact region 59 of the cover wall 12 of the cover element 3 of the air dryer 1. In this state the spring 38a, 38b is pretensioned.

A pulling element or anchor element 47 extends coaxial to the longitudinal axis 7-7 through the air dryer cartridge 2 and the desiccant 35. For the embodiment shown in FIG. 1, the anchor element 47 is built by a rod or wire 48. Both the pressing element 37 and the supporting element 44 comprise a central guiding sleeve 49, 50. The anchor element 47 passes through the guiding sleeves 49, 50. Both the supporting element 44 as well as the pressing element 37 have a degree of freedom with respect to the anchor element 47 along the longitudinal axis 7-7. The pressing element 37 is guided both by a guiding contact between the guiding sleeve 50 and the outer surface of the anchor element 47 as well as by a guiding contact between the guiding collar 51 and the inner surface of the side wall 21. The supporting element 44 is only guided by the contact of the guiding sleeve 49 with the outer surface of the anchor element 47. Additional force components with an orientation transverse to the longitudinal axis 7-7 might also be produced by the spring 38a, 38b.

The anchor element 47 is (fixedly or with a limited translational degree of freedom along the longitudinal axis 7-7) linked with the base wall. For the shown embodiment according to FIG. 1, for this purpose the anchor element 47 passes through a holding or guiding sleeve 52 located in or built by a central bore of the base wall 20. On the side facing away from the desiccant 35, the degree of freedom of the anchor element 47 with respect to the base plate 20 is limited by equipping the anchor element 47 with a stop element or thickening 53. For the embodiment shown in FIG. 1, a disc 54 is interposed between the thickening 53 and the guiding sleeves 52.

On the side facing away from the spring 38a, 38b the anchor element 47 protrudes from the supporting element 44. On this side the anchor element 47 comprises a stop element or thickening 55. For the embodiment shown in FIG. 1, a disc 56 is interposed between the stop element 55 and supporting element 44. Here, the disc 56 is guided in longitudinal direction by the anchor element 47.

In the assembled state shown in FIG. 1 there is a gap 57 between the supporting element 44 and the stop element 55. Above, the width of the gap 57 has been denoted with F. For the shown embodiment according to FIG. 1, the anchor element 47 is fixed at the base wall 20 such that the gap 57 is built between the stop element 55 and the supporting element 44. However, in case of using a sliding guidance between the sliding sleeve 57 and the anchor element 47 it is also possible that the gap 57 is built between the base wall 20 and the stop element 53 (in some cases also with a fixation of the anchor element 47 in the sliding sleeve 49).

For disassembled cover element 3 (e.g. during transportation and/or stocking of the air dryer cartridge 2 and at the beginning of the assembly process or at the end of the disassembly process) the supporting element 44 (with interposed disc 56) abuts at the stop element 55 without any gap 57 being present. In this state the supporting element 44 has moved relative to the anchor element 47 by the distance F in upper direction from the state shown in FIG. 1. Due to the stop element 55, it is not possible that the supporting element 44 might completely separate from the air dryer cartridge 2. Instead, the disc 54, the base wall 20, the non-woven fabric 34, the desiccant 35, the non-woven fabric 39, the pressing element 37, the spring 38a, 38b, the supporting element 44 and the disc 56 are trapped with a clamping force between the two stop elements 53, 55.

For the assembly of the air dryer cartridge 2 in an air dryer, the cover element 3 is removed from the air dryer 1 and the air dryer cartridge 2 is positioned on the socket element 4. In this state the supporting element 44 (with interposed disc 56) contacts the stop element 55. In the next assembly step the cover element 3 is assembled with the socket element 4. This might be done by screwing the inner thread 17 of the cover element 3 with the outer thread 9 of the socket element 4. During the screwing process, a contact region 58 built by the front surface of the supporting collar 64 comes into contact with the counter contact region 59 of the cover wall 12 of the cover element 3. With further screwing the cover wall 12 moving downwards along the longitudinal axis 7-7 moves the supporting element 44 in downward direction. This movement of the supporting element is caused by the contact force at the counter contact region 59. With the movement the width of the gap 57 increases. With the screwing process also the tension of the spring 38a increases. The increasing tension of the spring 38a results in an increased clamping force of the air dryer cartridge 2 in the air dryer 1 in the direction of the longitudinal axis 7-7 as well as in an increase of the pressing force of the desiccant 35. For applying a screwing torsional moment, the cover element 3 might be equipped with an inner hexagonal recess 60 at the cover wall 20. With the screwing process the inner chamber 18 is sealed by pressing the front surface 15 of the cover element 3 at the sealing element 11.

The bases of the springs 38a, 38b might be guided in guiding elements of the pressing element 37 and the supporting element 44. In FIG. 1 the guiding elements are built by ring collars 61, 62.

During a load phase of the air dryer cartridge 2 the stream of pressurized air in the air dryer 1 according to FIG. 1 is as follows:

Pressurized air passes from the inlet chamber 5 via intermediate spaces between the ribs 25 to an intermediate chamber 63 built between the inner surface of the side wall 13 of the cover element 3 and the outer surface of the side wall 21 of the air dryer cartridge 3. In the intermediate space 63 the pressurized air streams in upward direction. Below the cover wall 12 of the cover element 3 the streaming direction reverses. Then the pressurized air streams to an outer region 43 via a residual opening 64 built between the upper edge of the side wall 21 and the upper edge of the supporting element 44. The residual opening 64 has a ring-shape. From the outer region 43 the pressurized air streams via the passages 41, the non-woven fabric 39, the desiccant 35, the non-woven fabric 34 and the passages 22 to the outlet chamber 6.

There are a lot of options for building the stop elements 53, 55. For the embodiment shown in FIG. 1, the anchor element 47 is built by a rod or wire 48. The stop elements 53, 55 are manufactured by a forming process, namely by deforming the ends of the rod or wire 48 from a small circular cross-section to an increased cross-section with segments of a circle and flattenings.

The housing 19, the pressing element 37 and/or the supporting element 44 might be made of metal, a light metal or plastic. It is possible that these elements are built by forming or injection molding.

For removed cover element 3 the supporting element 44 is freely accessible from the outside so that the supporting element 44 is (at least partially) not covered by a wall of the housing of the air dryer cartridge 2.

After the disassembly of the air dryer cartridge 2 from the air dryer and a removal of the stop element 55 (e.g. plastic deformation), it is possible to remove the supporting element 44, the spring 38 and the pressing element 37. For an embodiment not shown in the figures, the supporting element 44, the spring 38 and the pressing element 37 build an assembly unit. In the next step it is possible to remove an exhausted desiccant 35 from the inner chamber 24. If present and necessary, also other filter elements can be removed. In a next step a fresh desiccant (and fresh filter elements) are inserted into the inner chamber 24 with subsequent assembly of the pressing element 37, the spring 38 and the supporting element 44, e.g. with another plastic deformation for building the stop elements 55. The person with ordinary skill in the art will know that any other design of the stop elements 53, 55 might be used, e.g. a nut screwed with the anchor element 47 or any other removable or releasable stop element.

Figure 2:
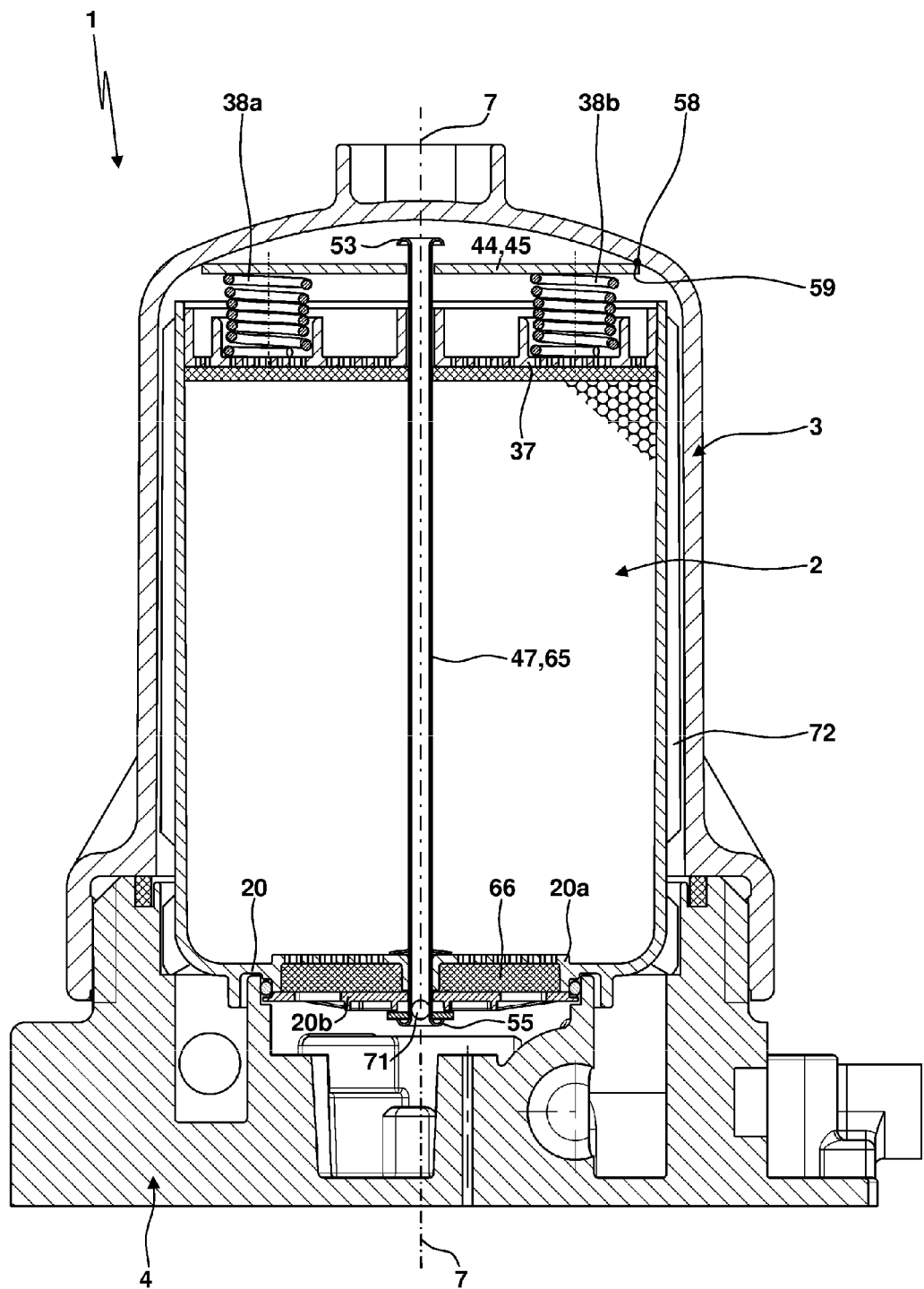

FIG. 2 shows an air dryer cartridge 2 in an air dryer 1 with a design generally corresponding to the embodiment shown in FIG. 1. However, in this case the supporting element 44 is built by a pure plane circular disc (so without a supporting collar 46 and without ring collars 61 for receiving the springs 38a, 38b). In this modified design the contact region 58 is built by the radial outer edge region of the supporting plate 54.

Furthermore, in FIG. 2 the anchor element 47 is not built by a rod or wire 48 but by a tube 65. For building the stop elements 53, 55 the tube 65 in its end region is widened or provided with rivets. In FIG. 2 a sphere 71 is pressed into the tube 65 for closing a bypass for pressurized air.

For the embodiment shown in FIG. 2, the side wall 21 of the housing 19 of the air dryer cartridge 2 is equipped with ribs. The radial outer front surfaces of the ribs contact at the inner surface of the side wall 13 of the cover element 3 for guiding purposes.

The base wall 20 for the embodiment shown in FIG. 2 is built with a plurality of base wall parts 20a, 20b. The transfer of pressurized air from the inner chamber 24 to the outlet chamber 6 is provided by passages 22 in the upper base wall part 20a via an additional filter 66 which is held between the two base wall parts 20a, 20b. Here, also the lower disc-like base wall part 20b is secured by the stop element 55 as shown in FIG. 2.

Figure 3:
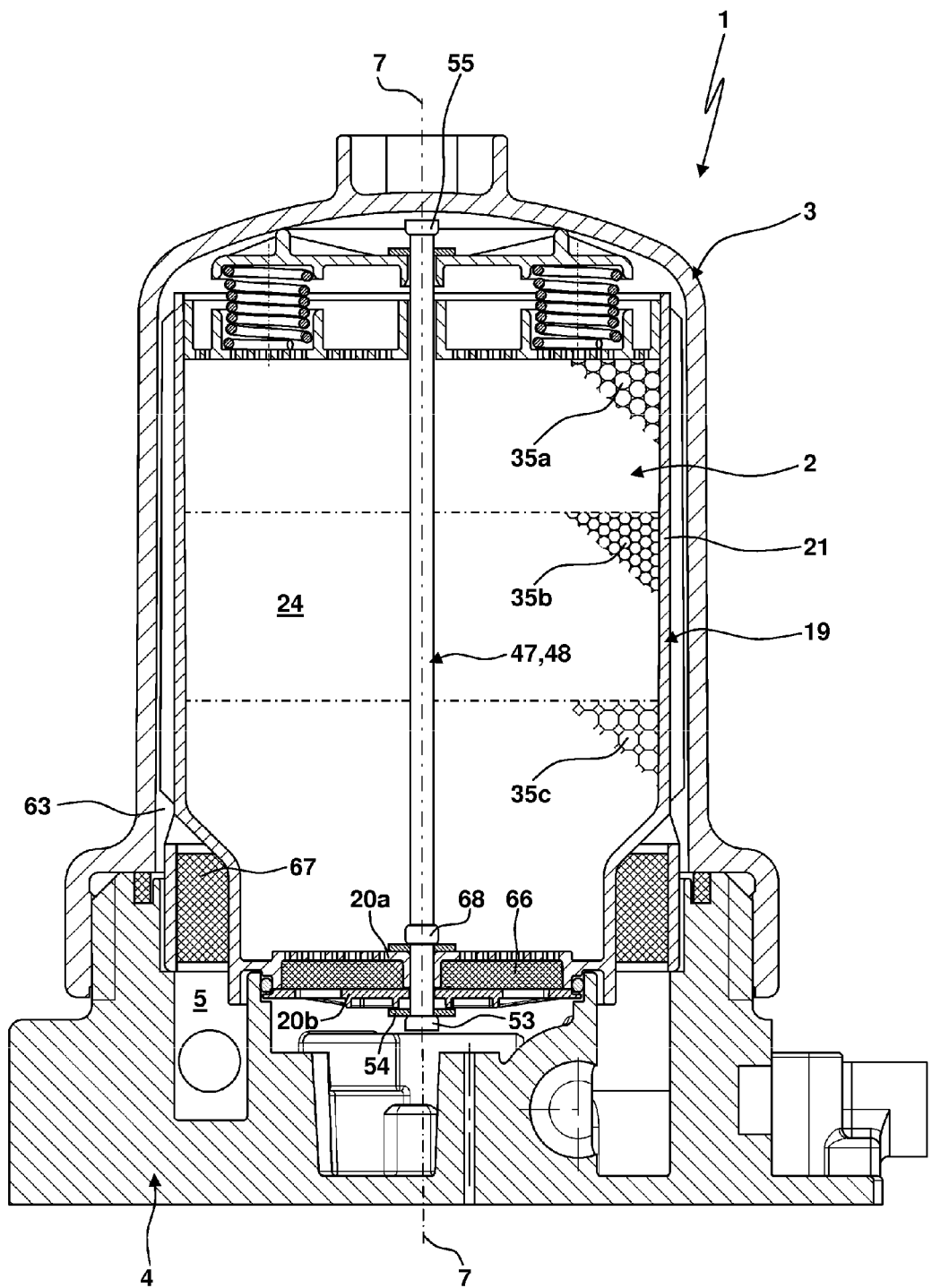

For a design generally corresponding to the embodiment shown in FIG. 1, according to FIG. 3 the side wall 21 of the air dryer cartridge 2 in a transitional region to the base wall narrows. In the transitional region a filter 67 is located which is interposed between the inlet chamber 5 and the intermediate chamber 63. For the shown embodiment the housing 19 is built with two coaxial hollow cylindrical wall parts. The filter 67 is interposed between the two wall parts. As can be seen in FIG. 3, different desiccants 35a, 35b and 35c are positioned in stacked layers in the inner chamber 24. Additionally, a filter 66 is used in the region of the base wall 20 (the filter 66 is in further detail described and shown in FIG. 2).

According to FIG. 3, the anchor element 47 built by a rod or wire 48 does not only comprise the end-sided stop elements or thickenings 53, 55. An additional thickening 68 is provided used for trapping the disc 54, the base wall part 20b, the filter 66 and the base wall part 20a (with an additional disc).

Figure 4:
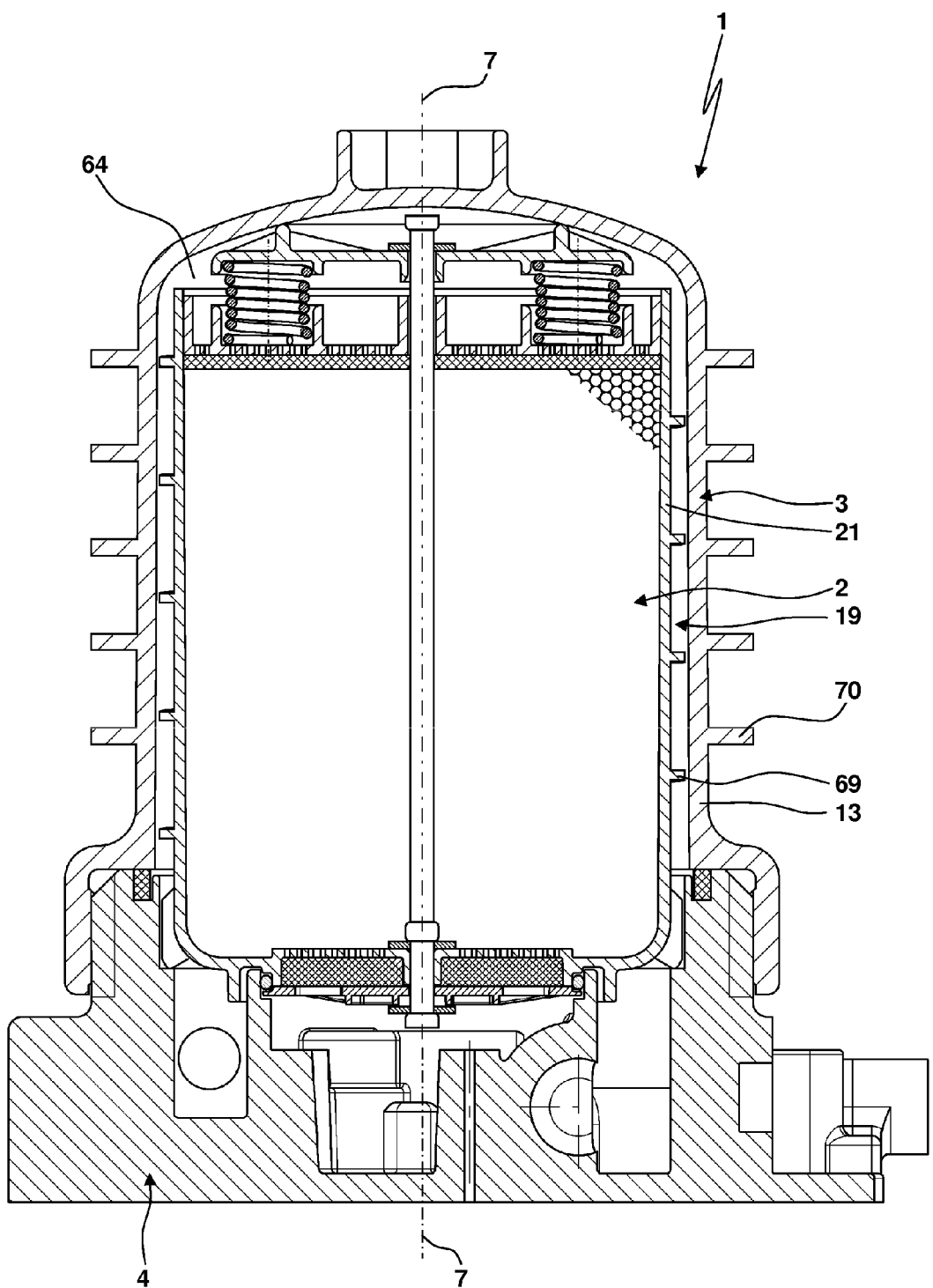

FIG. 4 shows an embodiment similar to that of FIG. 3. The housing 19 of the air dryer cartridge 2 in the region of the outer surface of the side wall 21 comprises a rib 69 extending spirally around the longitudinal axis 7-7. The rib 69 with its outer surface closely fits to the inner surface of the side wall 13 of the cover element 3. By means of the rib 69 a type of cyclone is built. The cyclone has the effect that pressurized air is not transferred to the opening 64 from the inlet chamber 5 by a pure vertical movement parallel to the longitudinal axis 7-7, but spirally guided along the outer surface of the side wall 21. The length of the path of the pressurized air between the inlet chamber 6 to the opening 64 is increased which serves an increased cooling effect. The cooling might be provided by the inner surface of the cover element 3. For increasing the cooling effect, the cover element 3 might also be equipped with cooling ribs 70. For this embodiment a first condensation of humidity contained in the pressurized air might occur in the intermediate chamber 63 such that only a reduced remaining humidity passes the desiccant 35. This leads to extended load cycles before the need of a regeneration. Also the lifetime of the air dryer cartridge 2 without the need for a replacement of the desiccant 35 might be increased.

For a modified embodiment (not shown in detail) the support of the supporting element 44 by an anchor element 47 held by the base wall 20 might also be used for air dryer cartridges of the closed type as disclosed in DE 699 08 918 T2 (whereas in this case differing from DE 699 08 918 T2 the springs 38a, 38b are not supported at the top wall of the housing of the air dryer). In this way, also for air dryer cartridges according to the type of DE 699 08 918 T2 the stresses of the side wall of the housing of the air dryer cartridge 2 due to the pressing force might be reduced.

Figure 5:
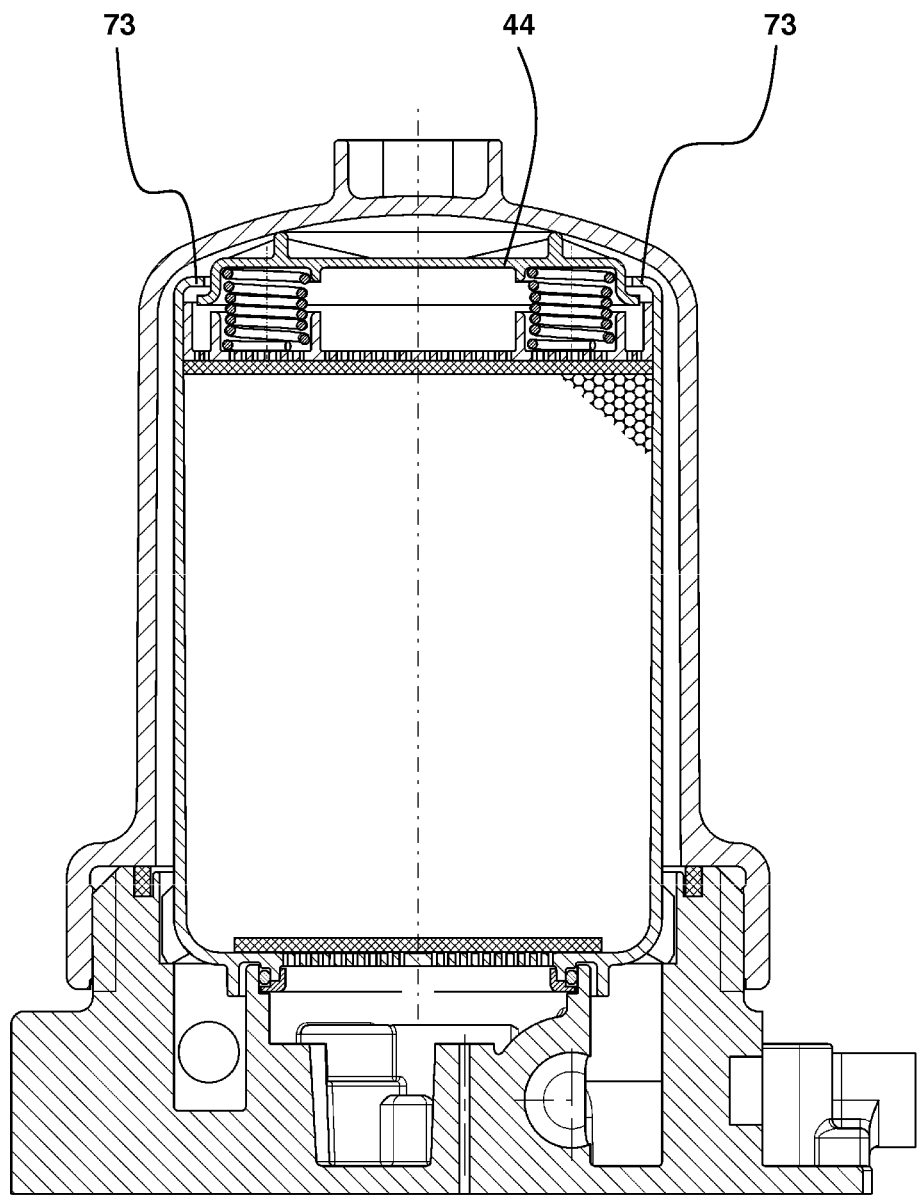

It is also possible that the springs 38a, 38b are used for clamping the air dryer cartridge 2 in the housing of the air dryer 1 without the use of anchor elements 47 extending through the air dryer cartridge 2. In this case, end regions of the side wall 21 might be plastically deformed in radial inner direction (or might be equipped with additional holding elements) such that the inner side of the plastically deformed regions or a holding element contact the upper side of the supporting element 44. Accordingly, the supporting element 44 is (similar to the design with the stop element 55) held in an upper end position. With the assembly of the air dryer cartridge 2 in the housing of the air dryer 1, the supporting element 44 moves away from the end regions 73 for clamping the air dryer cartridge 2 (see FIG. 5), The person with ordinary skill in the art will know that differing from the shown embodiments any modification of the stream of pressurized air, the paths, the branching of pressurized air streams to different streaming paths, the use of different filters, cyclones or labyrinth filters, the use of coalescing filters and the like might also be possible within the frame of the present invention.

For one particular embodiment, the housing 19 of the air dryer cartridge 2 is made of plastic. Here, the cover element 3 is made of cast aluminium.

Many variations and modifications may be made to the preferred embodiments of the invention without departing substantially from the spirit and principles of the invention. All such modifications and variations are intended to be included herein within the scope of the present invention, as defined by the following claims.

I claim:

1. An air dryer cartridge for an air dryer of a utility vehicle, said air dryer cartridge comprising:
    a housing,
    a desiccant,
    a pressing element for pressing said desiccant
    a supporting element, said supporting element supporting at least one spring biasing said pressing element,
    wherein said supporting element is movable with respect to said housing,
    wherein said supporting element is accessible from the outside of said air dryer cartridge,
    wherein said supporting element is movable, a displacement of said supporting element results in a change of a tension of said spring and a displacement of said supporting element in a direction away from said desiccant is limited by a stop element, said stop element being an integral part of the housing or said stop element being supported by said housing, and
    wherein said stop element is designed and arranged such that a dimension of said air dryer cartridge limited by said supporting element is larger than the corresponding dimension of a housing of an air dryer for which said air dryer cartridge is designated.

2. The air dryer cartridge of claim 1
wherein said pressing element and said supporting element are located in a top region of said air dryer cartridge,
said supporting element is supported by a pulling element supported at a base wall of said air dryer cartridge, and
said pulling element extends through said air dryer cartridge.

3. The air dryer cartridge of claim 1, wherein
a) a housing of said air dryer cartridge comprises an opening to an inner chamber, said inner chamber housing said desiccant, and
b) said supporting element at least partially closes said opening.

4. The air dryer cartridge of claim 2, wherein
a) a housing of said air dryer cartridge comprises an opening to an inner chamber, said inner chamber housing said desiccant, and
b) said supporting element at least partially closes said opening.

5. The air dryer cartridge of claim 1, wherein said stop element is built by an anchor element extending through said air dryer cartridge.

6. The air dryer cartridge of claim 5, wherein said stop element is built by a plastic widening.

7. The air dryer cartridge of claim 5, wherein said anchor element comprises a rod, a wire, a screw or a tube.

8. The air dryer cartridge of claim 1, wherein said supporting element comprises a supporting plate.

9. The air dryer cartridge of claim 2, wherein said supporting element comprises a supporting plate.

10. The air dryer cartridge of claim 1, wherein a plurality of springs is interposed between said supporting element and said pressing element.

11. The air dryer cartridge of claim 2, wherein a plurality of springs is interposed between said supporting element and said pressing element.

12. The air dryer cartridge of claim 1, wherein said supporting element comprises an outer contact region designed, configured and arranged for contacting a housing of an air dryer.

13. The air dryer cartridge of claim 2, wherein said supporting element comprises an outer contact region designed, configured and arranged for contacting a housing of an air dryer.

14. The air dryer cartridge of claim 1, wherein said housing of said air dryer cartridge at least partially comprises a plastic material.

15. The air dryer cartridge of claim 2, wherein said housing of said air dryer cartridge at least partially comprises a plastic material.

16. An air dryer for a pressurized air system of a utility vehicle comprising an air dryer cartridge,
the air dryer cartridge comprising:
a housing,
a desiccant,
a pressing element for pressing said desiccant
a supporting element, said supporting element supporting at least one spring biasing said pressing element,
wherein said supporting element is movable with respect to said housing, and
wherein said supporting element is accessible from the outside of said air dryer cartridge; and
wherein
a) said supporting element with an outer contact region contacts a counter contact region of a housing of the air dryer and
b) said spring which is interposed between said pressing element and said supporting element both influences
ba) the clamping of the air dryer cartridge between two parts of the housing of the air dryer for fixing said air dryer cartridge in said air dryer and
bb) the pressing of said desiccant.

* * * * *